Patented Jan. 5, 1943

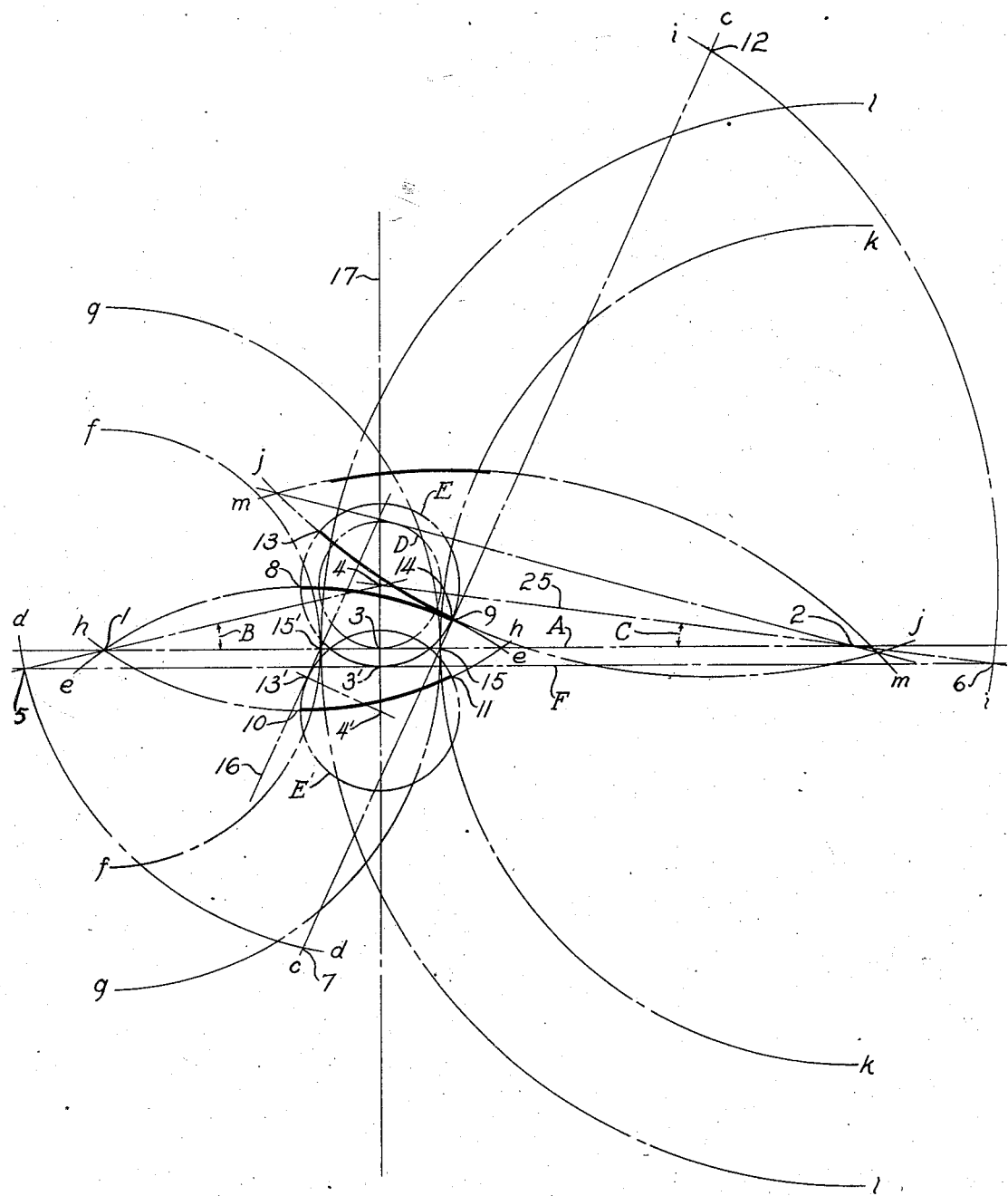

2,307,394

UNITED STATES PATENT OFFICE 2,307,394

GEARING

Charles C. Davis, Detroit, Mich., assignor to The Timken-Detroit Axle Company, Detroit, Mich., a corporation of Ohio Application March 20, 1941, Serial No. 384,421

17 Claims. (Cl. 74—462)

The present invention relates to improvements in variable leverage gearing of the kind described in Patent No. 2,009,915, issued July 30, 1935, and in particular to the tooth forms of such gearing.

The effectiveness of variable leverage gearing, when used in automobile differential mechanisms or for like purposes, depends in large measure on the degree of periodic variation in leverage or torque ratio effected when the differential gears are turning due to a loss or variation in the traction of one of the differentially driven wheels or the like.

The purpose of the present invention is to provide variable leverage or high traction gearing including an increased leverage action without increasing the size of the gears employed in the differential or the like except for the increase due to increased tooth length, and without introducing objectionable tooth interference, and to provide a method of generating the tooth forms to the attainment of such end.

This invention also contemplates the provision of a meshing variable leverage gear and pinion the teeth of which have curves of action of greater length than heretofore thought possible without increase of the size of the gears as determined by the center to center spacing of their axes or by their pitch diameters.

A further object of this invention is to provide tooth forms for high traction gears having arcuate curves of action drawn with radii substantially differing from the back cone distance of the gear or pinion of a bevel gear set, or the corresponding pitch circles of a pair of meshing variable leverage spur gears.

Another object of the invention is to provide high traction gears having increased leverage as a result of a lengthening of the curves of action of the teeth of the meshing gears to a length greater than the distance between centers of adjacent meshing gears measured when contacting at approximately mid-point of their curves of action.

Still another object of the invention is to provide an improved way of developing tooth forms for high traction gears that will result in more effective teeth, regardless of the length of the curves of action, without necessitating a change in the pitch diameters of the gears.

Still further objects of the invention will appear as the description thereof proceeds with reference to the accompanying drawing in which, The figure is a diagrammatic illustration of the preferred method of determining the curves of action of a mating set of spur or bevel gears having increased leverage action.

Reference can be made to the copending application of Arthur P. Woods, Serial No. 384,380, filed on even date herewith, for a description and diagrammatic illustration of the method of determining the curves of action and the outer tooth profiles of bevel gear teeth by a spherical method instead of by the back cone method.

In high traction differentials employing variable leverage gears, when an odd number of pinion gears is used, it has been found to be important to provide an odd number of teeth on the pinion and an even number of teeth on the side gear. If such a differential employs a side gear with an odd number of teeth, then there must be an odd number of pinion gears, each having an odd number of teeth. Combinations of seven teeth on the pinion and twelve teeth on the gear are very satisfactory in operation. So is the combination of seven teeth on the pinion and ten teeth on the gear. The present invention has been found by test to be very satisfactory in operation when the 7–12 and 7–10 combinations are employed and is believed to be equally satisfactory in other combinations. It is to be understood therefore that the invention is not restricted to the 7–12 combination selected for purposes of illustration on the drawing, and that the invention includes tooth forms for bevel gears as well as for spur gears, in accordance with the following description.

In laying out gear teeth in accordance with the present invention, it is preferred that the curves of action of the teeth be of arcuate form so that a rolling action takes place as the meshing gear and pinion operate. The wear of the gears is thus minimized, resulting in a longer life for the set of gears. The tooth forms provided by the present invention, wherein they provide arcuate curves of action and increased leverage, are laid out by proceeding in the following manner, the known factors being the center to center spacing of the gear and pinion, the number of teeth of the gear, the number of teeth of the pinion, and the pressure angle at which the gears are to operate.

The curve of action is the working portion of the tooth profile, or the locus of the point of driving contact along a tooth profile.

On a base line A points 1 and 2 are the center points of a spur pinion and gear, respectively, the space between said points corresponding to the center to center spacing of the gear and pinion.

A triangle is then formed by drawing a line at an angle B to the base line A from the point 1, the angle B being equal to 360° divided by four times the number of teeth in the pinion, and by drawing a further line from the point 2 at an angle C to base line A, the angle C being equal to 360° divided by four times the number of teeth in the cooperating gear. The lines thus drawn intersect at point 4 and a triangle 1—2—4 results. Line 17 is drawn through point 4, perpendicular to and crossing line A at 3.

With point 4 as a center and a radius equal to the altitude of the triangle 1—2—4 a circle D is drawn tangent to line A at 3. A concentric circle E having a center at the point 4 and a radius exceeding the altitude of the triangle 1—2—4 is then drawn, the excess in the length of the radius of circle E over the radius of circle D being selected in accordance with the desired length of the longer curves of action of the gear and pinion. For example, if a spur gear having a 10 per cent increase of leverage over spur gears of the same size and number of teeth, but laid out in accordance with the teachings of Patent No. 2,009,915 is desired, then the radius of the circle E exceeds the radius of circle D by approximately 12 per cent. The percentage of increase is affected by the pressure angle of the teeth. If the leverage variation is to be increased 20 per cent then the radius of circle E is made approximately 24 per cent greater than that of circle D. Instead of a 10 or 20 per cent increase of leverage, other increases of varying degree may be obtained by the present invention. In the case of bevel gears laid out in accordance with the teachings of Patent No. 2,009,915, the radius of circle E is made approximately 16 per cent greater than the radius of circle D to obtain a 10 per cent increase in leverage, and is made approximately 32 per cent greater than the radius of circle D to obtain a 20 per cent increase in leverage, other increases in leverage being obtained by proportionately changing the radius of circle E. The radius of circle E, however, must not be so large that in generating the tooth a part of the working profile is lopped off.

The tooth pressure line c—c is then drawn tangent to circle E at an angle to the line 3—4 equal to the selected pressure angle for the pair of gears.

A line F parallel to base A and tangent to circle E at point 3' is then drawn and the sides 4—1 and 4—2 of the triangle 1—2—4 are extended until they intersect line F at the points 5 and 6, the latter points being thus established.

With the point 4 as a center and with a radius equal to the distance between the points 4 and 5 the arc d—d is then drawn intersecting the pressure angle line c—c at 7. With the latter point as the center and a radius equal to the distance between the tangent point 3' and point 5, arc e—e is drawn. Arc e—e intersects circle E at the points 8 and 9 and the curve ending at said points, shown by a heavy line on the drawing, is the curve of action of one side of a pinion tooth laid out in accordance with the present invention.

Arc h—h is then drawn symetrically to arc e—e with respect to the base A as a center line, the portion of the arc h—h between the points 10 and 11, shown by heavy line on the drawing, constituting the curve of action of the other side of the tooth of the pinion. It will be observed that the arcs e—e and h—h intersect approximately at the center point 1 of the pinion in the example that is illustrated in the drawing and that the curves of action of the pinion tooth are portions of arcuate surfaces that will intersect approximately at or beyond the center of the pinion, the point of intersection varying in accordance with the increase in leverage represented proportionately by the difference between the radii of circles D and E.

To develop the curve of action of the mating gear tooth, arc i—i is drawn with the point 4 as a center and a radius equal to the distance between the points 4 and 6. Arc i—i intersects the pressure angle line c—c at 12. From the latter point as a center, and with a radius equal to the distance between the points e' and 6, arc j—j is drawn. Said arc intersects circle E at points 13 and 14, the portion of the arc between said points shown by a heavy line on the drawing constituting the curve of action of one side of the gear tooth.

The curve of action of the other side of the gear tooth is laid out by drawing arc m—m symmetrically to arc j—j with respect to a radial line passing through the center point 2 of the gear and tangent to circle D.

It will be observed that the arcs j—j and m—m intersect at a point beyond the center point 2 of the gear.

The curves of action of the pinion and gear developed as just described, it will be noted, have a length exceeding the distance between the centers of adjacent meshing teeth of the gear and pinion measured at approximately the mid-length of the curves of action of the gear and pinion teeth, said distance being represented on the drawing by the diameter of circle D, or twice the altitude 4—3 of triangle 1—2—4.

The line c—c crosses the line A at 15. The gear inner pitch circle k—k and the pinion outer pitch circle g are drawn, tangent at point 15. Circle E', identical with E, is drawn about 4' as a center, point 4' being a distance 3—4' equal to 3—4 on the other side of the base A, and on the line 17. Line 16 is drawn, parallel to line c—c and tangent to circle E' at 13'. Line 16 crosses base A at 15'. The gear outer pitch circle l—l and the pinion inner pitch circle f—f are drawn, tangent at 15'. The line 15—15' is the locus of the point of tangency of the instantaneous gear and pinion pitch circles as they shift with rotation of the gears. Reference can here be made to Figure 7 of the application of Arthur P. Woods, Serial No. 384,380, filed on even date herewith, where the gears are shown in three positions of meshing engagement.

Variable leverage gearing having curves of action of a length less than the distance between centers of adjacent teeth may also be developed in accordance with the present invention and by proceeding as already described, after selecting a diameter for circle E that is less than the diameter of circle D in the desired proportion, and then laying out the curves of action in the manner outlined. The present invention accordingly provides a way of laying out the teeth of variable leverage gearing that is capable of use in a manner permitting the formation of properly functioning teeth having curves of varying lengths without alteration in the sizes of the cooperating gears other than that resulting from lengthening the teeth. Generally when variable leverage gearing is used the maximum variation of leverage for gearing of a specified size is sought. However, at times, as for example, when the shaft aperture of a gear of definite diameter is unusually large so that the radial thickness of metal is limited, it then is desirable, to avoid undue weakening of the gear spider, to provide teeth having curves of action of a length less than would be provided by following the practice described in Patent No. 2,009,915. Such teeth may readily be formed in accordance with the method of the present invention, as well as teeth having increased leverage which are preferred when the gear aperture provides metal of sufficient radial thickness to permit their formation without undue weakening of the gear structure.

Because it has not been found practical to provide high traction teeth that give leverage variation throughout the entire cycle of engagement of the meshing teeth, it is necessary to provide outer profile curves between the outer points of the curves of action on opposite sides of each tooth. These outer profile curves function to maintain the gears in proper engagement in the period between engagement of successive curves of action of mating teeth. The outer profile curves therefore control the engagement of the gear between successive cycles of leverage variation of the mating gears. If they are not properly formed, interferences and excessive back-lash develop with the result that the gears wear out rapidly and do not give satisfactory practical service.

Like the curves of action, when properly designed, normals to the outer profile curves at the points of contact with the mating tooth curves must pass through the point in the line of gear centers at which the instantaneous pitch curves are tangent. To be practical, the tooth profiles, including the outer profile curves must be convex curves that can be cut or generated on commercial gear cutting machines.

In properly developed high traction gear curves, in each relative position of engagement of a mating pair of gears, two points on an engaging tooth, one on each side of the tooth, are in contact with points on the teeth of the meshing gear.

By using tooth forms as described in this present specification, the common normals to the points of contact of the curves of action of mating teeth pass through the point in the line of centers at which the instantaneous pitch circles are tangent.

The only practical curves of action so far developed which satisfy all of the foregoing conditions are those developed in accordance with the principles of the Davis Patent No. 2,009,915, in accordance with the principles set forth in this specification, and in accordance with those set forth in the application of Arthur P. Woods, Serial No. 384,380, filed on even date herewith.

Points on the outer tooth profiles of the teeth of the spur gear and pinion are found by rotating the center of one gear about that of the other and determining the point where a common normal to the outer tooth profile and the mating tooth at the point of contact will pass through the point in the line of centers at which the instantaneous pitch circles are tangent. Reference can be made to Figure 8 of the application of Arthur P. Woods, Serial No. 384,380, filed on even date herewith, for a specific illustration of the determination of such a point. By this construction the outer tooth profiles of the gear will engage the curves of action of the pinion and vice versa in such a manner that there is no back-lash or tooth interference. Suitable uniform back-lash to permit lubrication is provided for by proper tolerance during manufacture. The arcs $j$—$j$, $e$—$e$, etc., which include the curves of action of the gear and pinion teeth, are extended inward beyond ends 9 and 8, respectively, of the curves of action of the gear and pinion by a distance sufficient to provide ample clearance between the outer ends and the bottom lands of the meshing teeth, as described in Patent No. 2,009,915.

The manner in which the leverage of the meshing gears is thus varied and the results that flow therefrom are now well understood in the art.

All of the teeth of the gear and pinion are developed in the manner already described with reference to a single tooth of the pinion and a single tooth of the gear, and in the case of spur gears, forms are then cut to the shapes thus provided, which forms are then utilized as cams or templates to produce gears in accordance with gear cutting practices well known to those skilled in the art.

The method of generating variable leverage tooth forms having increased leverage in accordance with the present invention has been described with particular reference to spur gearing, but the same principles are applicable in the generation of tooth forms for bevel gearing, using either the back cone or the spherical method of laying out the gears.

Diagrammatic illustrations of the method of determining the curves of action and the outer tooth profiles of bevel gear teeth, by the sperical method, are shown in the co-pending application of Arthur P. Woods, Serial No. 384,380, filed on even date herewith.

The single figure of the drawing also illustrates the layout of bevel gear teeth laid out on the development on a plane surface of the back cones of the gear and pinion. However, line A or the distance from 1 to 2 represents the sum of the back cone distances of the gear and pinion, since the figure will represent the development, on a plane surface, of the gear and pinion back cones.

In order to simplify the drawing, the main pitch circles of the spur gear and pinion or the back cone circles of the bevel gear and pinion are not shown in the figure. In the case of a 7-12 tooth combination of spur gear and pinion, the tangent point of the main pitch circles will be 7/19 of the distance from 1 to 2 along the line of centers 1—2 and will be adjacent point 3. In the case of bevel gears the back cone circles will be tangent at a point on the line 1—2 adjacent point 3 and their radii will be proportional to the back cone distances of the respective gear and pinion.

Line A is rotated about point 1 through an angle B equal to 360 degrees divided by four times the number of teeth in the back cone diameter of the pinion, where the number of teeth in the back cone diameter is equal to the number of teeth in a spur gear having the same circular pitch as those of the bevel gear and with a pitch circle equal to the back cone distance of the bevel pinion. Usually there will be a fractional number of teeth in the back cone diameter.

Line A is then rotated about point 2 through an angle C equal to 360 degrees divided by four times the number of teeth in the back cone diameter of the gear. The rotated lines meet at 4, forming a triangle 1—2—4 having base A and vertex 4. Point 4 is the center of circle D which is tangent to A at 3. Line 17 is perpendicular to A and passes through 4. From this point on the determination of the curves of action is made in the same manner as with spur gears, circle E being larger than D and having the same center 4. The resulting forms are those of the teeth on a planar development of the back cones of the gear and pinion.

The outer tooth profiles are preferably determined by cutting out the back cone development of the curves of action, as laid out above, forming the developments into cones corresponding to the gear and pinion back cones, and determining points on the outer tooth profiles such that a common normal to an outer tooth profile where it contacts the curve of action of a tooth of its mating gear will pass through the same point in the line of centers as the common normal to simultaneously contacting curves of action of mating teeth, the said point occurring on the line of centers where the instantaneous pitch circles are tangent, as described in the copending application of Arthur P. Woods, Serial No. 384,380 filed on even date herewith.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed and desired to be secured by United States Letters Patent is:

1. A meshing variable leverage gear and pinion having tooth profiles including curves of action of a length greater than the distance between the centers of adjacent meshing teeth on the gear and pinion measured at approximately the mid-length of the curves of action of the gear and pinion teeth.

2. A variable leverage gear and pinion having meshing teeth each of which has a circular curve of action of a length greater than the distance between the centers of adjacent teeth measured at approximately the mid-length of the curves of action of the gear and pinion teeth.

3. A variable leverage gear or pinion, having teeth each of which has a curve of action of a length greater than the distance between the centers of adjacent meshing teeth measured at approximately the mid-length of the curves of action of the gear and pinion teeth, the curves of action of said teeth having a profile of circular arcuate form, the radius of the arc of the profile exceeding the radius of the instantaneous pitch circle of said gear or pinion when it is engaged at approximately its mid-length of its curve of action.

4. A variable leverage gear and pinion having meshing teeth contacting at various points along the tooth profiles, the points of contact shifting over a length of the tooth profiles exceeding the center to center spacing of adjacent meshing teeth of the gear and pinion measured at approximately the mid-length of the curves of action of the teeth.

5. A variable leverage gear having a tooth profile including a curve of action of circular arcuate form, the radius of the arc of the profile substantially exceeding the radius of the pitch circle of the gear.

6. Tooth forms for mating variable leverage gearing having curves of action developed by laying out a triangle having a base of a length corresponding to the spacing of the centers or to the sum of the back cone distances of the mating gears, and sides at angles to the base equal to 360 degrees divided by four times the number of teeth in the respective gears or their back cone diameters, said sides intersecting to form the apex of said triangle; drawing a circle from said apex as a center and with a radius differing from the altitude of the triangle; drawing a pressure angle line tangent to said circle and intersecting the base of said triangle at an angle complemental to the selected tooth pressure angle; and describing circular arcs in said circle having their centers in said pressure angle line on opposite sides of the point of tangency of said pressure angle line with said circle and passing through said point of tangency; said arcs between the points of intersection with said circle forming curves of action of the gear teeth and providing leverage in said mating gears differing in proportion to the extent that the radius of said circle differs from the altitude of said triangle.

7. Tooth forms for mating variable leverage bevel gearing having curves of action substantially corresponding to those developed by laying out on a plane surface a triangle having a base of a length corresponding to the sum of the back cone distances of the mating gears, and having sides making angles to the base equal to 360 degrees divided by four times the number of teeth in the back cone diameters of the respective gears, said sides intersecting to form the apex of said triangle; drawing a circle from said apex as a center and with a radius differing from the altitude of the triangle; drawing a pressure angle line tangent to said circle and intersecting the base of said triangle at an angle complemental to the selected tooth pressure angle; and describing circular arcs in said circle having their centers in said pressure angle line on opposite sides of the point of tangency of said pressure angle line with said circle and passing through said point of tangency; said arcs between the points of intersection with said circle forming curves of action of the gear teeth and providing leverage in said mating gears differing in proportion to the extent that the radius of said circle differs from the altitude of said triangle.

8. Tooth forms for mating variable leverage gearing having curves of action developed by laying out a triangle having a base of a length corresponding to the spacing of the centers of the mating gears, and sides at angles to the base equal to 360 degrees divided by four times the number of teeth in the respective gears, said sides intersecting to form the apex of said triangle; drawing a circle from said apex as a center and with a radius differing from the altitude of the triangle; drawing a pressure angle line tangent to said circle and intersecting the base of said triangle at an angle complemental to the selected tooth pressure angle; and describing circular arcs in said circle having their centers in said pressure angle line on opposite sides of the point of tangency of said pressure angle line with said circle and radii corresponding to the respective portions of the base of a triangle having an altitude equal to the radius of said circle and base angles equal to the base angles of said first-named triangle, said arcs passing through said point of tangency and forming curves of action of the gear teeth between the points of intersection with said circle; said curves of action providing leverage in said mating gears differing in proportion to the extent that the radius of said circle differs from the altitude of said triangle.

9. Tooth forms for mating variable leverage bevel gearing having curves of action substantially corresponding to those developed by laying out on a plane surface a triangle having a base of a length corresponding to the sum of the back cone distances of the mating gears, and having sides making angles to the base equal to 360 degrees divided by four times the number of teeth in the back cone diameters of the respective gears, said sides intersecting to form the apex of said triangle; drawing a circle from said apex as a center and with a radius differing from the altitude of the triangle; drawing a pressure angle line tangent to said circle and intersecting the base of said triangle at an angle complemental to the selected tooth pressure angle; and describing circular arcs in said circle having their centers in said pressure angle line on opposite sides of the point of tangency of said pressure angle line with said circle and radii corresponding to the respective portions of the base of a triangle having an altitude equal to the radius of said circle and base angles equal to the base angles of said first-named triangle, said arcs passing through said point of tangency and forming curves of action of the gear teeth between the points of intersection with said circle; said curves of action providing leverage in said mating gears varying in proportion to the extent that the radius of said circle varies from the altitude of said triangle.

10. Tooth forms for mating variable leverage gearing having curves of action developed by laying out a triangle having a base of a length corresponding to the spacing of the centers of the mating gears, and sides at angles to the base equal to 360 degrees divided by four times the number of teeth in the respective gears, said sides intersecting to form the apex of said triangle; drawing a circle from said apex as a center and with a radius exceeding the altitude of the triangle; drawing a pressure angle line tangent to said circle and intersecting the base of said triangle at an angle complemental to the selected tooth pressure angle; and describing circular arcs in said circle having their centers in said pressure angle line on opposite sides of the point of tangency of said pressure angle line with said circle and passing through said point of tangency and in close proximity or through the centers of said respective gears, said arcs between the points of intersection with said circle forming curves of action of the gear teeth and providing increased leverage in said mating gears in proportion to the extent that the radius of said circle exceeds the altitude of said triangle.

11. Tooth forms for mating variable leverage bevel gearing having curves of action substantially corresponding to those developed by laying out on a plane surface a triangle having a base of a length corresponding to the sum of the back cone distances of the mating gears; and having sides making angles to the base equal to 360 degrees divided by four times the number of teeth in the back cone diameter of the respective gears, said sides intersecting to form the apex of said triangle; drawing a circle from said apex as a center and with a radius exceeding the altitude of the triangle; drawing a pressure angle line tangent to said circle and intersecting the base of said triangle at an angle complemental to the selected tooth pressure angle; and describing circular arcs in said circle having their centers in said pressure angle line on opposite sides of the point of tangency of said pressure angle line with said circle and passing through said point of tangency and in close proximity or through the centers of said respective gears, said arcs between the points of intersection with said circle forming curves of action of the gear teeth and providing increased leverage in said mating gears in proportion to the extent that the radius of said circle exceeds the altitude of said triangle.

12. A variable leverage gear having individual teeth the curves of action of which are portions of circular arcs drawn so as to intersect at or approximately at or beyond the center of the gear.

13. A meshing variable leverage gear and pinion having tooth profiles including curves of action of a length greater than the distance between centers of adjacent meshing teeth on the gear and pinion, said curves of action being portions of circular arcs drawn so as to intersect at or approximately at or beyond the center of the respective gear or pinion.

14. A meshing variable leverage bevel gear and pinion having tooth profiles including curves of action of a length greater than the distance between centers of adjacent meshing teeth on the gear and pinion, said curves of action when laid out on the development on a plane surface of the back cones of the gear and pinion being portions of circular arcs drawn so as to intersect approximately at the center of the development of the back cone of the respective gear or pinion.

15. A variable leverage bevel gear and pinion which, when laid out on the developments of the back cones of the gear and pinion on a plane surface, have teeth each of which has a curve of action of a length greater than the distance between the centers of adjacent meshing teeth measured at approximately the mid-length of the curves of action of the gear and pinion teeth, the curves of action of said teeth having a profile of circular arcuate form, and the radius of the arc of the profile exceeding the back cone distance of the instantaneous pitch circle of said gear or pinion when it is engaged at approximately its mid-length of its curve of action.

16. A variable leverage bevel gear having a tooth profile which, when laid out on the development of its back cone on a plane surface, includes a curve of action of circular arcuate form, the radius of the arc of the profile substantially exceeding the radius of the back cone distance of the gear.

17. Tooth forms for mating variable leverage bevel gearing as described in claim 7, wherein said radius is shorter than the altitude of said triangle.

CHARLES C. DAVIS.